3,320,278
ALPHA-(2-AMINO)-3-INDOLYL LOWER
ALIPHATIC ACID DERIVATIVES
William V. Ruyle, Scotch Plains, and Tsung-Ying Shen, Westfield, N.J., assignors to Merck & Co., Inc., Rahway, N.J., a corporation of New Jersey
No Drawing. Filed June 30, 1965, Ser. No. 468,550
6 Claims. (Cl. 260—326.12)

This invention relates to new chemical compounds. More particularly, it relates to a new class of compounds of the indole series. Still more particularly, it is concerned with new α-[(2-amino and 2-amino substituted)-3-indolyl] lower aliphatic acids having an aromatic carboxylic acyl radical, including aroyl and heteroaroyl radicals of less than three fused rings, attached to the nitrogen atom of the indole ring. It is concerned also with salts, amides, anhydrides and esters of such compounds. It relates also to the synthesis of such substances.

The novel aroyl and heteroaroyl 2-nitrogen substituted-3-indolyl lower aliphatic acids of this invention have the general formula:

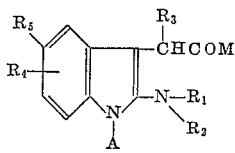

wherein A is a substituted or unsubstituted aromatic homocyclic or heterocyclic carboxylic acid radical, preferably containing less than three fused rings, more specifically an aroyl or heteroaroyl radical of the formula ArC=O wherein Ar is, for example, phenyl, naphthyl or biphenyl, or the formula HetC=O wherein Het is, for example, furyl, thienyl, pyrryl, thiazolyl, thiadiazolyl, pyrazinyl, pyridinyl, quinolyl, isoquinolyl, pyrazolyl, imidazolyl, oxazolyl, or a benz derivative thereof such as benzisoxazolyl, benzimidazolyl, benzofuranyl, benzothiazolyl, benzotriazolyl, benzoxazolyl, benzothienyl, indazolyl or isoindazolyl;

$R_1$ and $R_2$, which may be the same or different, are each hydrogen, alkyl, acyl, cycloalkyl, or alkenyl radicals;

$R_3$ is hydrogen or a lower alkyl radical containing, for example, up to 6 carbon atoms, such as methyl, ethyl, propyl, isopropyl, butyl, isobutyl, pentyl or hexyl;

$R_4$ is hydrogen, halogen or a lower alkyl, lower alkoxy or trifluoromethyl radical;

$R_5$ is hydrogen, lower alkyl, lower alkoxy, nitro, amino, lower alkylamino, di(lower alkyl) amino, lower alkanoylamino, lower alkanoyl, bis(hydroxy lower alkyl) amino, 1-pyrrolidino, 4-methyl-1-piperazinyl, 4-morpholino, cyano, amino lower alkyl, di(lower alkyl) amino lower alkyl, trifluoromethyl, hydroxyl, halogen, di(lower alkyl) sulfamyl, benzylthio, benzyloxy, lower alkylbenzyloxy, lower alkoxybenzyloxy, lower alkenyl, lower alkenyloxy, 1-azacyclopropyl, cyclopropylmethyloxy or cyclobutylmethyloxy;

M is hydroxyl, amino, substituted amino, lower alkoxy, lower alkenyloxy, lower alkynyloxy, aryloxy, cyclic lower alkoxy, lower alkenyloxy, lower alkynyloxy; substituted derivatives thereof; and OZ wherein Z is a cation including metals such as alkali or alkaline earth metals or OY where Y may be represented by the formula:

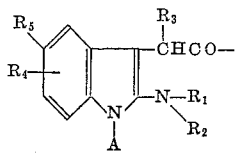

wherein A, $R_1$, $R_2$, $R_3$, $R_4$, and $R_5$ are as defined above.

Typical substituents which may be represented by M include methylamino, ethylamino, butylamino, dimethylamino, diethylamino, allylamino, phenethylamino, N-ethylphenethylamino, benzylamino, anilino, p-choroanilino, p-methoxyanilino, piperidino, pyrrolidino, morpholino, 1-methylpiperazino, N-phenylpiperazino, 1-(β-hydroxyethyl)-piperazino, 1 - methyl-2-aminomethylpyrrolidino, 1-ethyl-2-aminomethyl piperidino, tetrahydrofurfurylamino, N - carbobenzyloxymethylamino, N,N - dimethylcarboamidomethyl, 1,2,5,6 - tetrahydropyridino, methoxy, ethoxy, n-butoxy, t-butoxy, ethoxyethoxy, phenoxy, benzyloxy, diphenylmethoxy, triphenylmethoxy, cyclopropoxy, β - diethylaminoethoxy, β - dimethylaminoethoxy, phenethoxy, allyloxy, isopropoxy, 4-dimethylaminocyclohexyloxy, cyclopropylmethoxy, tetrahydrofurfuryloxy, cyclohexyloxy, cyclopentyloxy, cyclopropylethoxy, p-acetaminophenoxy, o-carboxyphenoxy and polyalkoxy lower alkyl such as the polyalkyl ethers derived from sorbitol, mannitol or other sugar alcohols containing up to six carbon atoms in the basic chain.

The invention also includes within its scope compounds wherein M is a cyclic lower alkylamino lower alkyl radical derived from N-(β-hydroxyethyl) piperidine, N-(β-hydroxyethyl)pyrrolidine, N-(hydroxymethyl)pyrrolidine, N - (β-hydroxyethyl)morpholine, N - methyl-2-hydroxymethyl pyrrolidine, N-methyl-2-hydroxymethyl piperidine, N-ethyl-3-hydroxy-piperidine, 3-hydroxyquinuclidine and N-(β-hydroxyethyl)-N'-methyl-piperazine.

Many compounds within the scope of the above definition are basic in nature and may be readily converted to acid addition salts. It is specifically intended to include those salts which are pharmaceutically acceptable within the purview of the invention. Such salts are formed by reaction between a free base of this invention and an acid having a pharmaceutically acceptable anion. The term "pharmaceutically acceptable anion" has a definite meaning to one skilled in the art. It is defined as a non-toxic anion of any of the simple acids used therapeutically to neutralize basic medicinal agents when the salts thereof are to be utilized therapeutically. These acids include both inorganic and organic acids as for example, hydrochloric, hydrobromic, hydriodic, sulfuric, succinic, phosporic, maleic, tartaric, citric, glycolic and others. The pharmaceutical activity of the molecule is primarily a function of the cation. The anion serves primarily to supply electrical neutrality.

In the preferred compounds of this invention, A is benzoyl and substituted at the para position with chlorine, $R_1$ and $R_2$ are hydrogen or lower alkyl, $R_3$ is hydrogen, $R_4$ is hydrogen and $R_5$ is lower alkyl, lower alkoxy, nitro, amino or substituted amino such as dimethylamino.

A feature of these compounds is the presence of an aroyl or heteroaroyl radical attached to the N–1 position of the indole. Thus, suitable aroyl substituents are the benzoyl and naphthoyl groups, and suitable heteroaroyl substituents include furoyl and isonicotinoyl. The aromatic rings of such groups may contain, and in the preferred compounds do contain, at least one substituent. This substituent may be lower alkyl or functional substituents such as hydroxy or an etherified hydroxy (hydrocarbonoxy) group such as a lower alkoxy, e.g., methoxy, ethoxy, isopropoxy, allyloxy, propoxy, an aryloxy or aralkoxy group, e.g., phenoxy, benzyloxy, halobenzyloxy, lower alkoxybenzyloxy and the like. It may be a nitro radical, a halogen such as chlorine, bromine, iodine or fluorine, an amino group or a substituted amino group, representative examples of which that might be mentioned are acylamino, amine oxide, ketimines, urethanes, lower alkylamino, lower dialkylamino, amidine, acylated amidines, hydrazine or a substituted hydrazine, alkoxyamines and sulfonated amines. Further, it may be a mercapto or a substituted mercapto radical of the type exemplified by alkylthio groups such as methylthio, ethylthio, and propylthio and aralkylthio or arylthio groups, e.g., benzylthio and phenylthio. The N–1 aroyl radical may, if desired, be haloalkylated, as with a trifluoromethyl, trifluoroethyl, perfluoroethyl, β-chloroethyl or like substituent, acylated as with acetyl, propionyl, benzoyl, phenylacetyl, trifluoroacetyl and like acyl groups, or it may contain a haloalkoxy or haloalkylthio substituent. In addition, the invention embraces compounds wherein the aroyl radical contains a sulfamyl, benzylthiomethyl, cyano, sulfonamido or dialkylsulfonamido radical. Further, it may contain a carboxy substituent, or a derivative thereof, such as an alkali metal salt or a lower alkyl ester of the carboxy radical, an aldehyde derivative of the type represented by acetals or thioacetals. In the preferred compounds, the N–1-aroyl radical is benzoyl and the functional substituent is in the para position of the six membered ring.

As aforesaid, the N-1 group may be a heteroacyl substituent, and more precisely a heteroaroyl substituent of the formula:

wherein Het represents a five- or six-membered hetero aromatic ring which may be part of a fused ring system containing less than three fused rings.

The α-(3-indolyl) lower aliphatic acids described herein are preferably α-(3-indolyl) derivatives of acetic, propionic, butyric, valeric and like acids. Esters, salts, amides and anhydrides of such aliphatic acids represent an additional aspect of the invention.

The salts of these new α-(1-acylated-2-nitrogen substituted-3-indolyl) lower aliphatic acids can be obtained by treatment of the free acid with an appropriate base under mild conditions. In this manner there may be obtained alkali metal salts such as the sodium and potassium, the aluminum or magnesium salts or salts of alkaline earth metals, examples of which are barium and calcium. Salts of organic amines such as dimethylamine, morpholine, methyl cyclohexylamine or glucosamine may be obtained by reacting the acid with the appropriate organic base.

The esters are important intermediates in the synthesis of the free acids, and in many cases are themselves of importance as end products. Among the preferred esters are the lower alkyl esters such as methyl, ethyl, propyl or t-butyl esters and aralkyl esters such as benzyl, p-halobenzyl and like esters having less than nine carbon atoms.

The following compounds are representative of those contemplated by this invention. These and others may be prepared by the procedures discussed herein below:

cyclopropylmethyl-α-[1-(6-fluoro-2-methyl-benzimidazole-5-carboxy)-2-amino-5-methoxy-3-indolyl] butyrate;

N-carbobenzyloxymethylamino-α[1-o,p-dimethylthiobenzoyl)-2-amino-5-bis(β-hydroxyethyl)amino-3-indolyl] caproamide;

2-dimethyl-3-diethylaminopropyl-α-[1-(2,6-dimethoxybenzoyl)2-diethylamino-5-cyclopropyl-methoxy-3-indolyl] valerate;

α-[1-(2-thenoyl)-2-(but-2-enamino)-5-(1-azacyclopropyl)-3-indolyl] butyric acid;

α-[1-(β-naphthoyl)-2-ethylamino-6-fluoro-5-(N-methylacetamido)-3-indolyl] octanoic acid;

α-[1-(p-dimethylsulfamyl-benzoyl)-2-amino-7-trifluoromethyl-5-(1'-pyrrolidino)-3-indolyl] hexanoic acid;

1-methyl-2-aminomethylpyrrolidyl-α-(1-nicotinoyl-2-diphenylamino-5-benzylthio-3-indolyl) β,β-dimethyl pentanamide;

N-phenylpiperazinyl-α-[1-(2,4-dichlorobenzoyl)-2-cyclopropylamino-5-(4-methyl-1-piperazinyl)-6-fluoro-3-indolyl] α-methyl hexanamide;

α-[1-(o-methyl-p-methylthiobenzoyl)-2-amino-4-methoxy-5-dipropylsulfamyl-3-indolyl] butyric acid;

α-[1-thiazole-2-carboxy)-2-acetamino-5-(4-methyl-1-piperazinyl)-3-indolyl] propionamide;

α-[1-(p-trifluoromethylbenzoyl)-2-benzoylamino-4-ethoxy-5-dimethylamino-3-indolyl] pentanoic anhydride;

β-diethylaminoethyl-α-[1-(2'-furoyl)-2-amino-5-acetamino-3-indolyl]-α-sec-butyl acetate;

allyl [1-(N,N-dimethyl-p-sulfonamidobenzoyl)-2-acetyl butyryl amino-5-(β-chloroethylamino)-3-indolyl]-α-hexyl-acetate.

The α - 2 - (nitrogen substituted) - 3 - indolyl lower aliphatic acids and derivatives thereof described herein are synthesized by acylation of the selected lower aliphatic acid, ester or anhydride having the desired substituents on the indolyl nucleus of the α-(3-indolyl substituted) aliphatic acid or derivative. It is preferred to carry out the acylation on an ester or anhydride derivative of the aliphatic acid. In those cases where the free acid is desired, the ester may be converted under suitable reaction conditions to the free acid.

It has been observed that the 1-aroyl or heteroaroyl substituent is easily hydrolyzed under conditions normally employed for saponification of an ester to the free acid. For this reason, care must be taken in converting the acid esters to the corresponding free acids. It has been found that one convenient method of accomplishing this conversion comprises acylation of the benzyl ester and subsequent hydrogenolytic removal of the benzyl group. Alternatively, other esters such as the t-butyl esters may be used since they are amenable to selective removal by other treatment, such as heating above 210° C. or by treating at 25–110° C., with a catalytic amount of an aryl sulfonic acid or other like acids. When, instead, of an ester, the amides of these acids are prepared, the free acids are formed by reaction of these amides with a stoichiometric quantity of nitrous acid in an inert solvent.

The acylation reaction is preferably conducted by treating the α-(3-indolyl)-lower aliphatic acid starting material or anhydride thereof, with an alkali metal hydride such as sodium hydride to form e.g., a sodium salt and then intimately contacting said salt with an aroyl or heteroaroyl acid halide in an anhydrous solvent medium. It is preferred to employ solvents such as dimethylformamide, dimethylformamide-benzene, toluene or xylene. It is preferred to carry out the acylation at about room temperature although lower temperatures may be employed if the particular reactants are unduly susceptible to decomposition.

An alternative method of acylating the 1-position is by use of a phenolic ester of the acylating acid, such as the p-nitrophenol in tetrahydrofuran and adding dicyclohexyl carbodiimide in tetrahydrofuran slowly. The dicyclohexylurea which forms is removed by filtration and the nitrophenylester is recovered from the filtrate. Alternatively, there can also be used the anhydride, azide, phenolic or thiophenolic ester of the acylating acid. Whichever agent is used, the acylation of the α-(3-indolyl)-lower aliphatic acid starting material is achieved by forming an alkali metal salt of the indolyl compound with, for example, sodium hydride in an anhydrous solvent and adding the acylating agent.

The α-(1-aroyl or heteroaroyl-3-indolyl)-lower aliphatic acid compounds and derivatives of this invention have a high degree of anti-inflammatory activity and are effective in the prevention and inhibition of granuloma tissue formation. Certain of them possess this activity in high degree and are of value in the treatment of arthritic and dermatological disorders and in like conditions which are responsive to treatment with anti-inflammatory agents. In addition, the compounds of this invention have a useful degree of antipyretic activity. For these purposes, they are normally administered orally in tablets or capsules, the optimum dosage depending, of course, on the particular compound being used and the type and severity of infection being treated. Although the optimum quantities of these compounds of this invention, to be used in such manner, will depend on the compound employed and the particular type of disease condition treated, oral dose levels of preferred compounds in the range of 10–4000 mg. per day are useful in control of arthritic conditions, depending on the activity of the specific compound and the reaction sensitivity of the patient.

The presently preferred process of synthesizing the subject α-[(2-amino and substituted amino)-3-indolyl] lower aliphatic acids comprises condensing phenylhydrazine or a substituted phenylhydrazine with α-keto glutaric acid or an appropriate derivative thereof to give a phenylhydrazone which is cyclized to form an indolyl di-basic acid or ester (which is hydrolyzed before the next step), dehydrating the acid to its anhydride, acylating at the N-1 position of the indole nucleus of the anhydride with an aromatic carboxylic acyl radical (aroyl or heteroaroyl), esterifying the thus-formed anhydride to give a 2-carboxy-3-esterified carboxyalkylene substituted indole, reacting this product with a halogenating agent to form the corresponding acid halide, converting this acid halide to the corresponding azide, the azide to a carbamate and the latter to an amine.

The indolyl aliphatic acid compounds discussed above may be prepared by reacting α-keto glutaric acid, an α'-substituted-α-keto glutaric acid or a derivative of said compounds with a phenylhydrazine to form an intermediate phenylhydrazone, which may be isolated or converted in situ to an indole. The reaction may be illustrated by the following reaction sequence which shows the preparation of 2-carboxy-5-methyl-3-indolyl acetic acid:

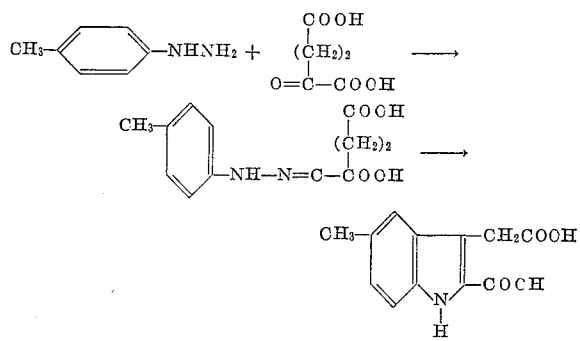

Acid addition salts of the phenylhydrazine reactant, for example the hydrochloride, are normally preferred over the free base, since they are more stable, although such salts and the bases from which they are derived are equivalent in the reaction itself. The substituted phenylhydrazines employed as one of the starting materials in this synthesis are prepared by known methods. The preferred method involves diazotization of the appropriately substituted aniline, followed by successive treatments with stannous chloride and sodium hydroxide.

Instead of a disbasic acid as the starting material in the above reaction series, a mono or diester of the dibasic acid, suitably an alkyl or alkaryl ester can be used in this synthesis. If such an ester is employed, the indole may be synthesized directly from this selected ester of the α-keto glutaric acid or an α'-substituted derivative thereof. With either an acid or ester starting material, the reaction is one of condensation with a phenylhydrazine and cyclization, as illustrated above.

The preferred synthesis is carried out in an alcohol solvent; hence, if the acid is used, the product is an indole diester of that solvent. The reaction is effected at a temperature from about 50° to about 120° C., during a period from about two to six hours. It is most convenient to reflux the mixture at the boiling point of the selected lower alkanol solvent. The presence of an acid catalyzes the cyclization.

Since the product is an indolyl diester, no matter whether an acid or ester is the starting material, the dibasic acid indole is obtained by hydrolysis in any convenient manner, e.g., by treatment with dilute alkali.

In an alternate procedure, with a dibasic acid as starting compound, a phenylhydrazone is first produced. This process is not feasible with an ester since the acid addition salt of the phenylhydrazone, which is preferably used, would produce dual esters and acids, due to a partial hydrolysis. Thus a phenylhydrazine and a dibasic α-keto glutaric or α'-substituted keto glutaric acid, preferably equimolar quantities, are stirred together for a period of from one-half to two hours, at a temperature from 60° to 100° C. The corresponding phenylhydrazone precipitates upon cooling.

Cyclization is effected in a solvent, or a solvent mixture may be employed as the reaction medium. Suitable solvents include polar oxygenated solvents such as lower alkanols, preferably methanol or ethanol. As indicated above, the cyclization reaction is catalyzed by acids; mineral acids such as hydrochloric or sulfuric acid are used, but other acidic reagents, including Lewis acids such as aluminum chloride, boron trifluoride, stannic chloride and the like are also useful. This reaction is preferably performed at a temperature from about 50° to 100° C., during a period of from 12 to 24 hours.

The product may be isolated in any convenient manner; for example, the reaction mixture is poured into dilute acid and extracted with base, then acidified to yield a 2-carboxy-3-indolyl lower aliphatic acid.

The dibasic acid formed as a result of either of the above series of reactions is next dehydrated, for example, by treatment with a dehydrating agent such as acetic anhydride, acetyl chloride or phosphorous oxychloride to give the cyclic anhydride of the indolyl dibasic acid. In the preferred reaction, an excess of the reagent is employed at temperatures from about 50° C. to 100° C. to dehydrate the acid rather than cause the loss of carbon dioxide.

In the next step, this anhydride is acylated at the 1-position, as described previously. It is preferred to have a slight excess of both the alkali metal hydride (sodium hydride is the preferred reagent) and the acylating agent, to effect as complete a reaction as possible.

This acylated anhydride is converted to a mono ester by opening the anhydride ring with an alkali metal alcoholate. It is important in this step that a carboxy function at the 2-position be generated for subsequent reactions while the carboxyalkylene group at the 3-position be esterified for protection. Additionally, the correct choice of an easily removable ester at the 3-position will enable the carboxyl group to be regenerated with minimum difficulty.

The desired reaction is effected using equimolar quantities of the esterifying agent. Low temperature conditions are preferred (i.e., −10° to 10° C.) so that the loss of product is minimized and to prevent the acyl group at the 1-position from being affected. The solvent medium used is a reaction inert solvent including ethers, for instance tetrahydrofuran, or an alcohol. To avoid the possibility of transesterification, the alcohol used as the solvent medium preferably contains the same alkoxy group as the selected alcoholate. The latter preferred reactants include the sodium salts of methyl, ethyl, benzyl and tert-butyl alcohols.

This last series of reactions may be illustrated by the sequence showing the preparation of methyl-(1-benzoyl-2-carboxy-5-methyl-3-indolyl) acetic acid:

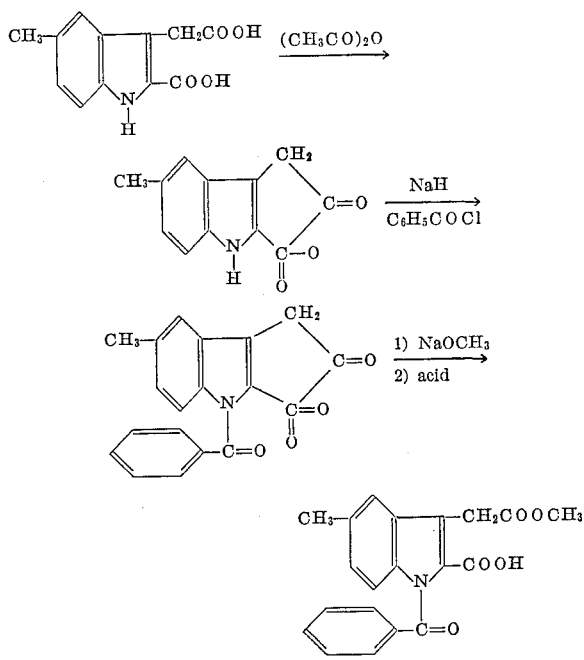

The compounds of the present invention containing the 2-amino or 2-lower alkyl amino substituted group are prepared from the 2-carboxy products described above according to the following process:

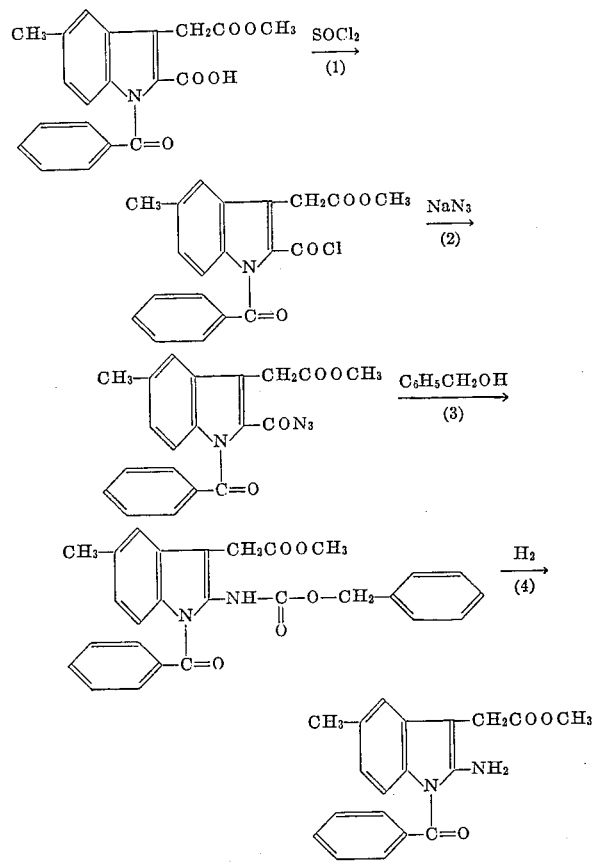

In step 1, the mono basic ester prepared above is converted to the corresponding acid halide, preferably the chloride or bromide, by reaction with a halogenating agent. These may include for example phosphorous trichloride, phosphorous oxychloride, phosphorous pentachloride, or the corresponding bromine compounds.

Preferred reagents are sulfuryl and thionyl halide, since by-products can be more readily eliminated. The reaction may take place in a reaction inert solvent such as tetrahydrofuran, dioxane, a di-lower alkyl ether or excess reagent, at a temperature of from about 35° to about 120° C., for a period of about one hour to about six hours. To obtain maximum yields, it is preferred that the reaction be carried out under anhydrous conditions. An inert atmosphere such as nitrogen may help to eliminate side reactions.

The thus formed haloformyl ester is next converted to an azide. This is preferably accomplished employing an alkali metal azide as the reagent, for example, sodium azide, in a modified Curtius reaction. In order to make the most economic use of halide compound, an excess of the azide reagent is preferred. The reaction takes place in a reaction inert polar solvent, including ketones up to six carbon atoms, such as acetone and methyl isobutyl ketone, and is carried out at low temperatures, i.e., from about —5° to about 5° C.

In step three, the azidoformyl compound, prepared as described above, is converted to a 2-substituted amino indole in which the substituent is readily removable by a reaction which does not adversely affect the balance of the indole molecule. A preferred class includes those groups readily removable by hydrogenation. Of these, the most readily available is benzyl alcohol, although substituted derivatives of benzyl alcohol are suitable. Hydrocarbons such as benzene or toluene or halogenated hydrocarbons are suitable solvents, but excess reagent can be used as the solvent if desired. The preferred temperature range is from about 80° C. to 220° C. The reaction is complete when the evolution of nitrogen ceases. But as a practical matter, the reaction is stopped when no more visible nitrogen is evolved. This normally takes about one-half to two hours.

If benzyl alcohol or one of its derivatives is the reagent utilized in the above reaction, the thus formed carbamate compound can be converted to a 2-amino indole ester by hydrogenation. This is usually accomplished in a lower alkanol such as methanol or butanol, in the presence of a noble metal catalyst, such as palladium or platinum. The preferred catalyst is palladium on an inert support, such as charcoal. The reaction is carried out at temperatures between about 20° C. and 40° C., and proceeds until no more hydrogen is absorbed. Depending upon the quantities of reactants involved, the length of reaction time might vary from about one-half to about two hours.

Compounds within the scope of this invention are amino acids which may exist as zwitterions, depending upon the environment in which they are produced.

Acid salts within the scope of the invention are readily prepared. A smaall amount of acid in the hydrogenation step described above will enable a salt of this type to be isolated. It is preferable that the acid used be one having a pharmaceutically acceptable anion as discussed above.

The 2-amino-3-indolyl esters prepared above can be further treated to yield other derivatives, or they may be used as produced. In the cases where an easily removable indole ester is prepared, such as benzyl or tert-butyl ester, by reaction of the anhydride of the 1-substituted indole with the appropriate alkali metal alcoholate, a 1-substituted-2-amino-3-indolyl lower alphatic acid is produced by the removal of the ester group. For example, the hydrogenolytic reaction described above for the reduction of the carbamate ester will convert a 3-indolyl benzyl ester to the corresponding free acid.

This invention also includes the amides of [1-acylated-(2-amino substituted)-3-indolyl] lower aliphatic acids. They are the products when the indolyl cyclic anhydride is opened with a secondary amine to yield a disubstituted amide derivative of the indole acid. The reaction is carried out in a lower alkanol solvent, such as methanol or propanol, at temperatures from about 20° to about 50° C. Because of the further reactive capabilities of the monosubstituted and unsubstituted amides of these compounds (due to the presence of the proton), the disubstituted amide is of most interest. However, when desired, a mono-substituted amide is produced by a reaction, identical to that described above, with a primary amine. An unsubstituted acid amide is produced by the reaction of ammonia on the symmetrical anhydride.

By carrying out a series of reactions on these amides, of the types outlined in the procedures described above, there is obtained, successively, the corresponding 2-acid halide, a 2-azidoformyl indolyl amide, a 2-amino ester (carbamate) derivative of that indolyl amide, and finally the desired 2-amino-1 - acylated - 3 - indolyl disubstituted amide acid addition salt.

The following reaction sequence, showing the preparation of N,N-dimethyl-1-benzoyl-2-amino-3-indolyl acetamide hydrochloride is illustrative:

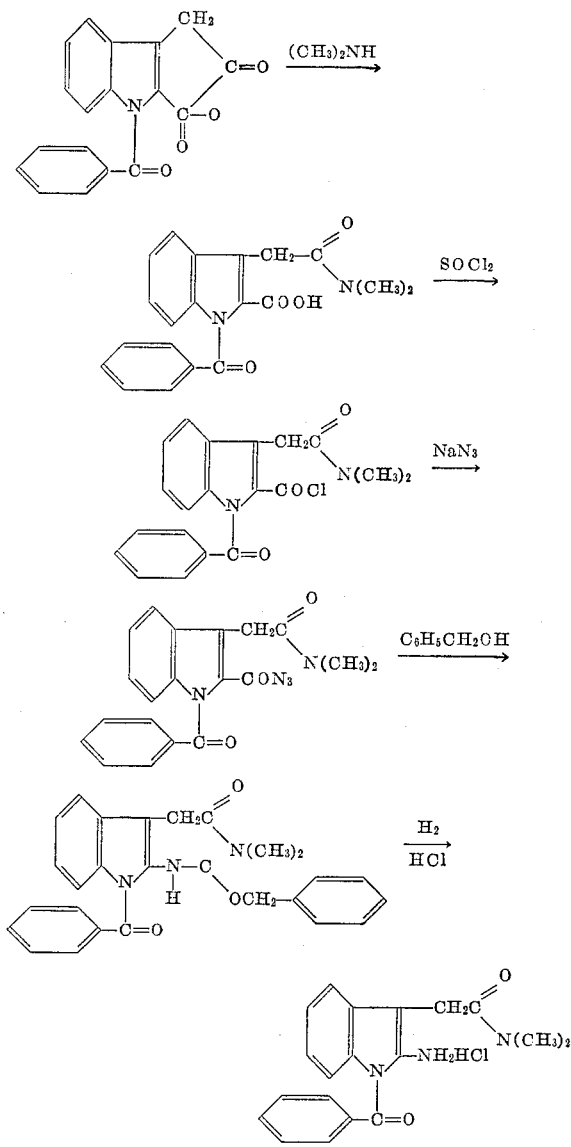

The reaction of the acid salt of the 2-amino-3-indolyl acid prepared above with a base, in aqueous medium, will produce basic salts of the novel aliphatic acids of this invention. The reagents may include bases of an alkali metal, alkaline earth metal, aluminum or other metal and organic bases such as triethylamine, ethanolamine and morpholine. The reaction is preferably carried out with an excess of the base present, to insure a good conversion yield, at temperatures from about 20° to about 50° C.

This invention also includes the 2-substituted amines within its scope. Secondary and tertiary amines are produced by reaction between a 1-substituted-2-amino-3-indolyl acid and an alkyl halide with the desired alkyl group. The iodide is the preferred reagent, and the reaction is usually carried out in aqueous media. The composition of the final product depends upon the proportion of reactants used. Thus when a slight excess of the alkyl halide is heated between about 40° and 200° C. for about 2 to about 6 hours, a secondary amine is produced. Conversely, if the halide is present in large excess, a tertiary amine of the starting compound is synthesized. However, for preparation of the secondary amine, a shorter reaction time, e.g., one to four hours, is preferred.

The a-acylated amino-substituted derivatives of these indole compounds are produced by the reaction between acyl halides or acid anhydrides and the 2-amino indoles. The preferred reagent is the anhydride since acid chlorides are often too reactive to permit adequate control of the reaction. The selected anhydride and the 2-amino indole are mixed together in aqueous medium at about 20° C. to about 100° C. for about one-half to about six hours. 2-N-alkyl-N-acylated amines of the invention may be prepared by the reaction of the acyl containing compound with a secondary amine, since this would be the first acylation.

Symmetrical anhydrides within the scope of this invention are prepared by intermolecular dehydration. This is accomplished by use of a mild dehydrating agent, dicyclohexylcarbodiimide being the most suitable. From about .40 to .60 mole per mole of indole is the preferred concentration of the dehydrating reactant. A reaction inert solvent including ether types, such as dialkyl ethers containing up to eight carbon atoms may be employed. The preferred condition for the reaction includes temperatures from about 20° to about 50° C. for about two to about five hours.

The synthesis of various compounds of this invention having on the indole ring system a 5-substituent which has a nitrogen attached to the homocyclic ring of the indole is generally based on the 5-nitro compound. This is transformed into the desired 5-substituent. Such transformation may be before or after acylation of the 1-position, depending on the extent to which the desired 5-substituent may interfere with the acylation. If such interference is possible, the 1-acylation should be carried out on the 5-nitro indole and the nitro later transformed into the desired 5-substituent. Such transformation can be carried out in a number of ways. Reduction of the 5-nitro groups gives a 5-amino group. Reaction of the amino with alkyl halides give mono and dialkyl amino groups. If the alkyl halide is a dihaloalkylene group (e.g., 1,4-dibromobutane) a heterocyclic ring (e.g., pyrrolidino) is formed. Similarly, bis (β-chloroethyl) ether will give an N-morpholino compound. Alkylation can also be carried out simultaneous with reduction, as, e.g., with formaldehyde and Raney nickel and hydrogen. Acylation can similarly be carried out on the 5-amino compounds or on the 5-nitro (with simultaneous reduction) to give 5-acylamido compounds. The 5-amino group can be reacted with isocyanates to give 5-ureido compounds.

The presence of the carboxy or amino groups at the 2-indole position might allow interaction of these radicals and the reagents used in the 5-substituent reactions. Hence, it is requisite that many of the above reactions relating to the 5-substituent be accomplished on the indole compound having the carbamate substituent at the 2-position, under neutral conditions.

The procedures outlined above can be altered somewhat without departing from the spirit and scope of this invention. Each one of the procedures is not necessarily applicable to the preparation of all compounds within the scope of the invention. Thus, for example, there may be substituted on the 2-amino group or on some other position of the indole nucleus a group which would interfere with reactions of a substituent at the 5-position. Problems such as this may be avoided by appropriate selection of the order in which the reactions are performed or by the use of blocking groups in accordance with standard practice.

This invention can be illustrated by the following non-limiting examples:

EXAMPLE 1

(a) *2-carboxy-3-indolyl acetic acid.*—A solution of 0.1 mole of phenylhydrazine and 0.1 mole of α-keto glutaric acid in 1.5 ml. of absolute ethanol is saturated with hydrogen chloride gas. The mixture is heated at reflux for one hour, cooled, and the precipitated ammonium chloride filtered off. The solvent is evaporated in vacuo and the residue triturated with water to obtain the diethyl ester of 2-carboxy-3-indolyl acetic acid. This ester is saponified by heating for two hours in 150 ml. of 2.5 N sodium hydroxide. Upon acidification of the alkaline solution with dilute hydrochloric acid 2-carboxy-3-indolyl acetic acid is obtained.

When an α'-substituted-α-keto glutaric acid is employed in the above reaction in place of α-keto glutaric acid, the corresponding 2-carboxy-3-indolyl (α-alkyl substituted) acid is obtained. For example, when α'-methyl-α-keto glutaric acid is used as a starting material (Blaise and Gault, Bull. Soc. Chim. [4], 9, 461, 1911) α-(2-carboxy-3-indolyl) propionic acid is the product. Alternately, by using an appropriately substituted phenylhydrazine with α-keto glutaric acid or its α'-substituted form, the following products are produced:

2-carboxy-5-fluoro-3-indolyl acetic acid
2-carboxy-5-methyl-3-indolyl acetic acid
α-(2-carboxy-5-ethoxy-3-indolyl) propionic acid
α-(2-carboxy-cyano-3-indolyl) valeric acid
α-(2-carboxy-5-hydroxy-3-indolyl) caprylic acid
α-(2-carboxy-5-isopropoxy-3-indolyl)-α-pentyl acetic acid
α-(2-carboxy-5-propyl-3-indolyl) octanoic acid
α-(2-carboxy-5-trifluoromethyl-3-indolyl) butyric acid
α-(2-carboxy-5-chloro-3-indolyl)-α-isobutyl acetic acid
α-(2-carboxy-5-benzyloxy-3-indolyl) isobutyric acid
α-(2-carboxy-5-acetyl-3-indolyl-β-γ-dimethyl pentanoic acid
α-(2-carboxy-5-cyclopropylmethyloxy-3-indolyl)-γ-ethylcaproic acid (b) *2-carboxy-5-nitro-3-indolyl acetic acid.*—A solution of 0.1 mole of α-keto glutaric acid in 100 ml. of hot water with a solution of 0.1 mole of p-nitrophenylhydrazine hydrochloride in 230 ml. of hot water with stirring. After one hour, the resultant hydrazone is filtered, washed with cold water, dried in vacuo and then added to a solution of 80 g. of fused zinc chloride in 65 ml. of absolute ethanol. The mixture is refluxed for 18 hours, cooled, poured into dilute hydrochloric acid and extracted with ether. The ethereal solution is extracted with sodium bicarbonate and then the latter is acidified with 2 N hydrochloric acid to yield 2-carboxy-5-nitro-3-indolyl acetic acid.

(c) When 0.2 mole of α-ketoglutaric acid is mixed with 0.2 mole of 3-trifluoromethylphenylhydrazine according to the procedure of Example 1B, the two isomers which are obtained, 2-carboxy-4-trifluoromethyl-3-indolyl acetic acid and 2-carboxy-6-trifluoromethyl-3-indolyl acetic acid, may be separated by chromatography.

When an equivalent amount of 4-methoxy-3-trifluoromethylphenylhydrazine, 4-nitro-3-trifluoromethylphenylhydrazine or 4-methyl-3-trifluoromethylphenylhydrazine is employed in the above procedure in place of 3-trifluoromethylphenylhydrazine, there is obtained both isomers of each, namely, 2-carboxy-4-trifluoromethyl-5-methoxy-3-indolyl acetic acid
2-carboxy-5-methoxy-6-trifluoromethyl-3-indolyl acetic acid
2-carboxy-4-trifluoromethyl-5-nitro-3-indolyl acetic acid
2-carboxy-5-nitro-6-trifluoromethyl-3-indolyl acetic acid
2-carboxy-4-trifluoromethyl-5-methyl-3-indolyl acetic acid
2-carboxy-5-methyl-6-trifluoromethyl-3-indolyl acetic acid.

When an α'-alkyl-substituted-α-keto glutaric acid is employed in the above reaction in place of α-keto glutaric acid, the corresponding α-alkyl substituted acids are obtained.

EXAMPLE 2

*The anhydride of 2-carboxy-3-indolyl acetic acid*

A mixture of one part of the acid prepared in Example 1 and ten parts of acetic anhydride is heated on a steam bath for one hour, cooled to precipitate the product, which is then separated by filtration and dried.

Similar treatment of the following products yields their corresponding cyclic anhydrides:

α-(2-carboxy-5-methoxy-3-indolyl)-propionic acid
α-(2-carboxy-5-cyclopropylmethyloxy-3-indolyl)-β,β-dimethyl butyric acid
α-(2-carboxy-5-t-butyl-3-indolyl) caproic acid
α-(2-carboxy-5-nitro-3-indolyl) valeric acid.

EXAMPLE 3

*Anhydride of 1-benzoyl-2-carboxy-3-indolyl acetic acid*

A total of 0.1 mole of the anhydride prepared in Example 2 and 0.11 mole of benzoyl chloride are stirred in 500 cc. of dimethylformamide under nitrogen, in an ice bath, while 0.13 mole of 50% sodium hydride-mineral oil is slowly added. After five hours, the reactants are poured into a mixture containing two liters of ice-water, one liter of ether and 10 cc. of glacial acetic acid; the aqueous phase is extracted with ether, washed with water and dried over sodium sulfate. Chromatography on a column of 100 g. of silica gel, using a 10 to 50% ether-petroleum ether mixture as eluent yields the anhydride of 1-benzoyl-2-carboxy-3-indolyl acetic acid.

Utilizing the proces of this example, the following compounds are prepared:

anhydride of 1-benzoyl-2-carboxy-5-fluoro-3-indolyl acetic acid
anhydride of α-(1-benzoyl-2-carboxy-5-nitro-3-indolyl) propionic acid
anhydride of α-(1-benzoyl-2-carboxy-5-isopropoxy-3-indolyl) valeric acid.

EXAMPLE 4

The procedure of Example 3 is followed using the following aroyl and heteroaroyl chlorides in place of benzoyl chloride to produce the corresponding N-1 aroyl and N-1 heteroaroyl derivatives of the cyclic anhydrides of 2-carboxy-5-(substituted and unsubstituted)-3-indolyl aliphatic acids:

p-methylthiobenzoyl chloride
p-chlorobenzoyl chloride
3,4,5,-trimethoxybenzoyl chloride
p-phenoxybenzoyl chloride
p-trifluoroacetylbenzoyl chloride
p-N,N-dimethylsulfamylbenzoyl chloride
3-furoyl chloride
1-methylimidazol-5-carboxylic acid chloride
1,3-dimethyl-2,3-dihydro - 2 - oxoimidazole-4-carboxylic acid chloride
1-methyl-benzimidazol-2-carboxy chloride
5-fluoro-2-thenoyl chloride
5-nitro-2-furoyl chloride
1-methyl-indazole-3-carboxy chloride oxazole-4-carboxy chloride
benzoxazole-2-carboxy chloride
thiazole-4-carboxy chloride
3-thenoyl chloride
1-methyl-6-nitroindazole-3-carboxy chloride
thiazole-2-carboxy chloride
2-phenylthiazole-4-carboxy chloride
2-benzylmercaptothiazole-4-carboxy chloride
p-acetylbenzoyl chloride
N,N-dimethyl-p-carboxamidobenzoyl chloride
p-cyanobenzoyl chloride
p-carbomethoxybenzyol chloride
p-formylbenzoyl chloride
p-trifluoro-methyl-thiobenzoyl chloride
N,N-dimethyl-p-sulfonamidobenzoyl chloride
p-methylsulfinylbenzoyl chloride
p-methylsulfonylbenzoyl chloride
p-benzylthiobenzoyl chloride
p-mercaptobenzoyl chloride
p-nitrobenzoyl chloride
p-dimethylaminobenzoyl chloride
p-acetaminobenzoyl chloride
o-fluoro-p-chlorobenzoyl chloride
o-methoxy-p-chlorobenzoyl chloride
o-hydroxy-p-chlorobenzoyl chloride
2,4,5-trichlorobenzoyl chloride.

EXAMPLE 5

*Benzyl-1-(p-chlorobenzoyl)-2-carboxy-3-indolyl acetate*

A mixture of one mole of sodium benzylate in one liter of dioxane, under nitrogen, is gradually added, with stirring, to 12–15 liters of dioxane, at 0° C., containing one mole of the anhydride of 1-p-chlorobenzoyl-2-carboxy-3-indolyl acetic acid. The mixture is stirred at 20–25° C. for two hours and then acidified with hydrochloric acid to pH 3 to precipitate benzyl-[1-(p-chlorobenzoyl)-2-carboxy-3-indolyl] acetate which is collected, washed with water and dried.

The benzyl esters of the following compounds are similarly prepared, utilizing the foregoing procedure:

anhydride of α-[1-(p-methylthiobenzoyl)-2-carboxy-5-nitro-3-indolyl] propionic acid,
anhydride of α-[1-(p-methoxybenzoyl)-2-carboxy-5-isopropoxy-3-indolyl]γ,γ-dimethyl valeric acid,
anhydride of 1-(5-fluoro-2-thenoyl)-2-carboxy-5-fluoro-3-indolyl acetic acid.

Also, when the sodium salts of other alcoholates are used in the above reaction in place of sodium benzylate, the following compounds are similarly prepared:

ethyl - [1 - (p - trifluoromethylbenzoyl)-2-carboxy-5-ethoxy-3-indolyl] acetate,
t-butyl-[1-(3-furoyl - 2 - carboxy-5-isopropoxy-3-indolyl] caproate,
triphenylmethyl-[1-(N,N-dimethyl-p-carboxamidobenzoyl)-2-carboxy-5-cyclobutylmethyloxy-3-indolyl]-butyrate,
methyl-[1-(p-chlorobenzoyl)-2-carboxy-5-nitro-3-indolyl] propionate.

In like manner, any of the 1-acylated 3-indolyl lower aliphatic cyclic anhydrides prepared heretofore may be esterified by reaction with the sodium salts of the following compounds:

N-(β-hydroxyethyl) piperidine,
N-(β-hydroxyethyl) pyrrolidine,
N-(β-hydroxyethyl) morpholine,
N-methyl-2-hydroxymethyl pyrrolidine,
N-methyl-2-hydroxymethyl piperidine,
N-ethyl-3-hydroxymethyl piperidine,
N-ethyl-3-hydroxy piperidine,
3-hydroxy quinuclidine,
N-(β-hydroxyethyl)-N′-methyl piperazine.

EXAMPLE 6

*Methyl-[1-benzoyl-2-amino-3-indolyl] acetate hydrochloride*

(a) *Methyl-[1 - benzoyl-2-chloroformyl-3-indolyl] acetate.*—A mixture of 0.1 mole of methyl-1-benzoyl-2-carboxy-3-indolyl acetate, two liters of dry ethyl ether, 74 ml. of thionyl chloride and 1 ml. of dimethylformamide is refluxed for 4.5 hours, protected from atmospheric moisture. The precipitate, methyl-[1-benzoyl-2-chloroformyl-3-indolyl] acetate is filtered and dried in vacuo. Additional product is obtained by dilution of the mother liquors with hexane.

Utilizing the foregoing procedure, the following 1-substituted and 5-substituted compounds are prepared: methyl-[1-(1-,3 - dimethyl - 2,3 - dihydro-2-oxoimidazole-4-carboxy) - 2 - chloroformyl - 5 - cyclopropylmethloxy-3-indolyl] acetate, benzyl - [1 - (3 - furoyl)-2-chloroformyl-5 - nitro - 3 - indolyl] valerate, β - dimethylaminoethyl-[1 - (1 - methyl-benzimidazol - 2 - carboxy)-2-chloroformyl-5-methoxy-3-indolyl] caproate.

(b) *Methyl - (1 - benzoyl-2-azidoformyl-3-indolyl) acetate.*—A solution of acid chloride from part (a) in 25 parts (by volume) of acetone, at 0° C., is mixed with a 1.2 molar concentrated aqueous solution of sodium azide. The mixture is stirred in the ice bath for ten minutes and then stirred at room temperature for twenty minutes more. Upon the addition of water, crude methyl-1-benzoyl-2-azidoformyl-3-indolyl acetate precipitates; this product is filtered, washed with water and thoroughly dried in vacuo.

The following compounds are similarly prepared, utilizing the foregoing procedure:

p-acetamino phenyl-(1-nicotinoyl-2-azidoformyl-5-isopropoxy-3-indolyl) acetate,
o-carboxyphenyl-[1-(2′theonyl)-2-azidoformyl-5-cyclopropyl-3-indolyl] propionate, (c) *Methyl - 1 - (1-benzoyl - 2 - carbobenzyloxyamino-3-indolyl) acetate.*—To a boiling mixture of 15 parts of toluene and 3 parts of benzyl alcohol is added one part of the product from part (b), in small portions. The mixture is refluxed about one-half hour and the solvent removed in vacuo. Chromatography of the crude product on a silica gel column using 20–50% (v./v.) ether in petroleum ether gives methyl-(1-benzoyl-2-carbobenzyloxyamino-3-indolyl) acetate.

Utilizing the foregoing procedure, the following 1-substituted and 5-substituted compounds are prepared:

Benzyl-[1-(4′-thiazolylformyl)-2-carbobenzyloxyamino-5-(butyloxy)-3-indolyl] octanoate,
methyl-(1-benzoyl-2-carbobenzyloxyamino-5-nitro-3-indolyl) acetate;
(N′-methylpyrrolidinyl-2)-methyl-[1-(o,p-di-chloro-benzoyl)-2-carbobenzyloxyamino-5-methoxy-3-indolyl] acetate (d) *Methyl-1-benzoyl-2-amino-3-indolyl acetate hydrochloride.*—A solution of 2.5 g. of the product of part (c) in 200 ml. of methanol is hydrogenated at 25° C. and atmospheric pressure in the presence of 0.5 ml. concentrated hydrochloric acid and three grams of a 10% palladium-on-charcoal catalyst. After completion of the hydrogenation, the catalyst is filtered off and the solvent evaporated in vacuo. Trituration of the crude product with ether yields methyl-2-amino-1-benzoyl-3-indolyl acetate hydrochloride.

The above hydrogenation step is used to prepare the following 1-acylated, 5-substituted compounds:

cycylopentyl-[-(1-methyl-6-nitro-indazole-3-carboxy)-2-amino-5-methyl-3-indolyl] valerate;
tetrahydrofurfuryl-[1-(p-trifluoromethylbenzoyl)-2-amino-5-trifluoromethyl-3-indolyl] caproate.

EXAMPLE 7

*Methyl-(1-benzoyl-2-carbobenzyloxyamino-5-amino-3-indolyl) acetate*

A total of 0.025 mole of methyl(1-benzoyl-2-carbobenzyloxyamino-5-nitro-3-indolyl) acetate in 100 cc. of methanol is hydrogenated at 25° C. and atmospheric pressure in the presence of 120 mg. of 10% palladium-on-charcoal as a catalyst. After completion of the hydrogenation, the catalyst is filtered off and the solvent evaporated in vacuo to give methyl-(1-benzoyl-2-carbobenzyloxyamino-5-amino-3-indolyl) acetate.

EXAMPLE 8

*Methyl-[1-benzoyl-2-carbobenzyloxyamino-5-(1'-pyrrolidino)-3-indolyl] acetate*

Methyl - (1 - benzoyl-2-carbobenzyloxyamino-5-amino-3-indolyl) acetate (1.5 g.), 1 g. of 1,4-dibromo-butane and 0.975 g. of anhydrous sodium carbonate to 80 cc. of ethanol are stirred at reflux temperature, in a nitrogen atmosphere, for six hours. The reaction mixture is then filtered and the filtrate is concentrated in vacuo to a small volume and diluted with ether. The solution is washed twice with water, dried in anhydrous sodium sulfate and concentrated in vacuo to dryness, leaving the product, methyl - [1-benzoyl - 2 - carbobenzyloxyamino-5-(1'-pyrrolidino)-3-indolyl] acetate.

When ethylene dibromide is used instead of dibromobutane, the product obtained is the 5-(1-azacyclopropyl) indolyl compound.

EXAMPLE 9

(a) *Methyl-[1-p-chlorobenzoyl-2-carbobenzyloxyamino-5-bis(β-hydroxyethyl)amino-3-indolyl] propionate*

A mixture of 0.02 mole of methyl-α-(1-p-chlorobenzoyl-2-carbobenzyloxyamino - 5 - amino-3-indolyl)propionate, 0.044 mole of ethylene oxide and 0.03 mole of acetic acid in 300 ml. dimethoxyethane is heated to 100° C. for 18 hours in an autoclave. The mixture is then diluted with water and filtered to yield crude methyl-[1-p-chlorobenzoyl-2-carbobenzyloxyamino - 5 - bis(hydroxyethyl)amino-3-indolyl]-propionate.

When an equivalent amount of propylene oxide is used in the above procedure in place of the ethylene oxide, there is obtained methyl-[1-p-chlorobenzoyl-2-carbobenzyloxy amino-5-bis(hydroxypropyl)amino-3-indolyl] propionate.

(b) *Methyl - [1-p-chlorobenzoyl - 2 - carbobenzyloxyamino - 5 - (4'-methyl-1'-piperazinyl)-3-indolyl] propionate.*—This product of (a) is stirred at 0° in pyridine with two mole proportions of p-toluenesulfonyl chloride until the reaction is substantially complete. The mixture is poured into water and the 5-bis(p-toluenesulfonyloxyethyl) amino compound is isolated. This is dissolved in benzene and one mole proportion of methylamine is added. The mixture is allowed to stand at room temperature for 3 days. The mixture is poured into iced water containing two equivalents of sodium carbonate and extracted with ether immediately. Evaporation of the ether yields methyl-[1-p-chlorobenzoyl-2-carbobenzyloxyamino-5-(4'-methyl-1'piperazinyl)-3-indolyl] propionate.

EXAMPLE 10

*Methyl-[1-p-chlorobenzoyl-2-carbobenzyloxyamino-5-(4'-morpholinyl)-3-indolyl] acetate.*

A solution of tosyl chloride (0.1 mole) in 200 ml. benzene is added dropwise with stirring to a solution of methyl-α-[1 - p - chlorobenzoyl - 2 - carbobenzyloxyamino-5 - bis(β - hydroxyethyl)amino - 3 - indolyl] acetate (0.1 mole) and pyridine (0.3 mole) in 300 ml. benzene at room temperature over a period of one hour. The mixture is then heated under reflux for 3 hours, washed with water, dried over sodium sulfate and evaporated to a syrup. Chromatography of the syrup on an alumina column using 30–50% (v./v.) ether in petroleum ether as the eluent gives methyl-[1-p-chlorobenzoyl-2-carbobenzyloxyamino-5-(4'-morpholinyl)-3-indolyl] acetate.

EXAMPLE 11

When the 5-amino and 5-substituted amino compounds of Examples 7 through 10 are hydrogenated according to the procedure of Example 6 (d), the corresponding 2-amino products are synthesized.

Alternately, when the procedure of this example is utilized on other 1-acylated-5-amino substituted indolyl esters the following compounds are prepared:

isopropyl-α-[1-(isoquinolyl-4-carboxy)-2-amino-5-(1'-pyrrolidino)-3-indolyl] valerate hydrochloride;

benzyl-α-[1-(5-fluoro-2-thenoyl)-2,5-diamino-3-indolyl]-α-isobutyl acetate dihydrochloride;

4-dimethylaminocyclohexyl-α-[1-(p-dimethylamino benzoyl)-2-amino-5-(1-azacyclopropyl)-3-indolyl]-γ-ethyl ethyl caproate.

EXAMPLE 12

*Methyl-[1-p-chlorobenzoyl-2,5-di(methylamino)-3-indolyl] acetate hydrochloride*

A mixture of 1.1 mole of carbobenzyloxy chloride, 500 ml. of pyridine and 1.0 mole of methyl-[1-p-chlorobenzoyl-2-carbobenzyloxyamino-5-amino-3 - indolyl] acetate is stirred at room temperature for four hours. It is then poured into water and the 2,5-di(carbobenzyloxyamino)indolyl compound is filtered, washed and dried.

This indolyl compound is then added to a suspension of sodium hydride in dimethylformamide with stirring and ice cooling. After one hour, methyl iodide is added and the mixture is stirred overnight, poured into ice water and extracted with ether. Evaporation of the ethereal solution and chromatography of the residual oil on an alumina column, using 15–25% (v./v.) ether in petroleum ether as the eluent, gives methyl-[1-p-chlorobenzoyl - 2,5 - di(N-methyl - carbobenzyloxyamino)-3-indolyl] acetate.

The product is subjected to hydrogenation at atmospheric pressure over palladium-on-charcoal, in ether solution. The catalyst is removed by filtration and evaporation of the ether gives methyl-[1-p-chlorobenzoyl-2,5-di(methylamino)-3-indolyl] acetate hydrochloride.

EXAMPLE 13

(a) *Methyl - (1 - p-chlorobenzoyl-2-carbobenzyloxyamino-5-aminomethyl-3-indolyl) acetate.*—A total of 0.1 mole of methy l- (1-p-chlorobenzoyl-2-carbobenzyloxyamino-5-cyano-3-indolyl) acetate is hydrogenated in ethanol in the presence of Raney nickel and three moles of anhydrous ammonia at 2000 p.s.i. at room temperature to give, after filtration of the catalyst and evaporation of the reaction mixture, methyl-(1-p-chlorobenzoyl-2-carbobenzyloxyamino-5-aminomethyl-3-indolyl) acetate.

(b) *Methyl - (1 - p - chlorobenzoyl-2-carbobenzyloxyamino - 5 - dimethylaminomethyl - 3 - indolyl) acetate.*—Treatment of the compound prepared in part (a) with 2 moles of methyl iodide gives the 5-dimethylaminomethyl derivative. Alternately, when ethyl iodide is used in the reaction, the 5-diethylaminomethyl derivative is obtained.

(c) When the products of (a) and (b) above are hydrogenated according to the procedure of Example 6(d), the corresponding 2-amino products are synthesized.

EXAMPLE 14

*1-benzoyl-2-amino-3-indolyl acetic acid hydrochloride*

A solution of 2.5 g. of benzyl-[1-benzoyl-2-carbobenzyloxy-3-indolyl] acetate in 200 ml. of methanol is hydrogenated at 25° C. and atmospheric pressure in the presence of 0.5 ml. concentrated hydrochloric acid and 3 g. of a 10% palladium-on-charcoal catalyst. After hydrogenation, the catalyst is filtered off and the solvent evaporated in vacuo. Trituration of the crude product with ether yields 2-amino-1-benzoyl-3-indolyl acetic acid hydrochloride.

The foregoing procedure is used to convert benzyl-[1-benzoyl - 2 - carbobenzyloxyamino-5-(N-methyl-carbobenzyloxyamino)-3-indolyl] acetate to the free acid, 1-benzoyl-2-amino-5-methylamino-3-indolyl acetic acid hydrochloride.

EXAMPLE 15

*1-p-chlorobenzoyl-2-amino-5-methoxy-3-indolyl acetic acid hydrochloride*

(a) *t - Butyl - (2-carboxy-5-methoxy-3-indolyl) acetate.*—t-Butyl alcohol (25 ml.) and 0.3 g. of fused zinc chloride are added to 0.1 mole of the anhydride of 2-carboxy-5-methoxy-3-indolyl acetic acid. The solution is refluxed for 16 hours and excess alcohol is removed in vacuo. The residue is dissolved in ether, washed several times with saturated bicarbonate, water, and saturated salt solution. After drying over magnesium sulfate, the solution is treated with charcoal, evaporated, and flushed several times with Skellysolve B for complete removal of alcohol. The ester is used without purification.

(b) *t - Butyl [1 - (p-chlorobenzoly)-2-carboxy-5-methoxy-3-indolyl] acetate.*—A stirred solution of ester from part (a) in 450 cc. of DMF is cooled to 4° in an ice bath, and sodium hydride (4.9 g., 0.098 mole, 50% susp.) is added in portions. After 15 minutes, p-chlorobenzoyl chloride (15 g., 0.085 mole) is added dropwise during 10 minutes, and the mixture is stirred for 9 hours without replenishing the ice bath. The mixture is then poured into 1 liter of 5% acetic acid, extracted with a mixture of ether and benzene, washed thoroughly with water, bicarbonate, saturated salt, dried over magnesium sulfate, treated with charcoal, and evaporated to a residue which partly crystallizes. This is shaken with ether, filtered, and the filtrate is evaporated to a residue which solidifies after being refrigerated overnight to yield the desired compound.

(c) The product of part (b) is treated according to the procedures of Example 6 to yield t-butyl-[1-(p-chlorobenzoyl)-2-amino-5-methoxy-3-indolyl] acetate.

(d) A mixture of 1 g. of the ester from part (c) and 0.1 g. powdered porous plate is heated in an oil bath at 210° C. with magnetic stirring under a blanket of nitrogen for about 2 hours. After cooling under nitrogen, the product is dissolved in benzene and ether, filtered, and extracted with bicarbonate. The aqueous solution is filtered with suction to remove ether, neutralized with acetic acid, and then acidified weakly with dilute hydrochloric acid. The product is 1-p-chlorobenzoyl-2-amino-5-methoxy-3-indolyl acetic acid hydrochloride.

The procedures of this example and that of Example 14 illustrate methods of preparation of 1-acylated-2-amino-5-(substituted or unsubstituted)-3-indolyl acids from esters which are amenable to selective removal of the ester group to obtain the free acid and addition salts thereof.

EXAMPLE 16

*Preparation of salts*

(a) A total of 0.2 mole of α-(1-benzoyl-2-amino-5-methoxy-3-indolyl) acetic acid hydrochloride is added to 50 ml. of water which has been flushed with nitrogen. The slurry is stirred under nitrogen and 20 ml. of 1.05 N sodium carbonate added with stirring. When a clear solution is obtained, a solution of 2.2 g. of $Al_2(SO_4)_3 \cdot 18H_2O$ in 8 ml. of water is added with vigorous stirring. The mixture is stirred until it is homogenous and the solid aluminum salt of (1-benzoyl-2-amino-5-methoxy-3-indolyl) acetic acid is recovered by filtration and washed with water and with ethanol.

In a similar fashion, there may be prepared the sodium and calcium salts as well as other salts, such as potassium, iron and magnesium, of the various (3-indolyl) aliphatic acids described in the accompanying examples.

(b) To a solution of 0.01 mole of 1-p-chlorobenzoyl-2-amino-5-methyl-3-indolyl acetic acid hydrochloride in 100 ml. of ether at 0° C. is added a solution of 0.01 mole of morpholine in 50 cc. of ether, dropwise, with stirring. The mixture is filtered and the resulting crystalline morpholine salt of 1-p-chlorobenzoyl-2-amino-5-methyl-3-indolyl acetic acid is washed with ether and dried in vacuo.

In a similar fashion, there may be prepared salts of organic bases, such as triethylamine, ethanolamine, n-butylamine, 2,3-xylidine, choline and piperazine by the reaction of these compounds with the various 3-indolyl aliphatic acids described in the accompanying examples

EXAMPLE 17

*1-benzoyl-2-amino-3-indolyl acetic anhydride*

To a solution of 0.1 mole of 1-benzoyl-2-amino-3-indolyl acetic acid in 200 cc. of tetrahydrofuran is added 0.049 mole of dicyclohexylcarbodiimide. The mixture is allowed to stand at room temperature for two hours. The precipitated urea is filtered and the filtrate removed in vacuo to give 1-benzoyl-2-amino-3-indolyl acetic anhydride.

Utilizing the procedure of this example, the following compounds are prepared:

α-[1-(methyl-benzothienyl-2-carboxy)-2-amino-5-monomethyl-anilino-3-indolyl] octanoic anhydride;
α-[1-(oxazole-4-carboxy)-2-amino-5-diethanolamino-3-indolyl]-γ-methyl hexanoic anhydride;
α-[1-(2-benzoylmercaptothiazole-4-carboxy)-2-amino-5-(p-chloro-anilino)-3-indolyl] caprilic anhydride.

EXAMPLE 18

(a) *N,N-dimethyl-1-benzoyl-2-carboxy-3-indoyl acetamide.*—A solution of the anhydride of 1-benzoyl-2-carboxy-3-indolyl acetic acid in ethanol is treated with a one molar solution of dimethylamine in ethanol. The resulting solution is concentrated in vacuo and the desired product isolated by chromatography on 50 parts (by weight) of silica gel using a 10 to 100% ether-petroleum ether mixture as eluent.

(b) Utilizing the procedure of part (a), but substituting an equivalent quantity of isopropylamine, diethanolamine, aniline, monomethylaniline, benzylamine, p-chloroaniline, β-methoxy-ethylamine, morpholine, p-methoxyaniline, methylamine, ethylamine, butylamine, allylamine, phenethylamine, N-ethylphenethylamine, piperazine, substituted piperazines such as N-phenyl piperazine, piperidine, substituted piperidines such as 1-ethyl-2-aminomethyl piperidine, pyrrolidine, substituted pyrrolidines such as 2-aminomethyl pyrrolidine and tetrahydrofurfurylamine in place of the dimethylamine used therein, there are obtained the corresponding N-substituted acetamides, or amides of any other lower aliphatic acid anhydride substituted therein.

(c) The procedure of part (a) of the example is followed using dry ammonia gas in place of dimethylamine. The ammonia is bubbled through the solution of the anhydride to produce 1-benzoyl-2-carboxy-3-indolyl acetamide.

(d) Utilizing the procedures of this example, the following compounds are prepared:

N-carbobenzyloxymethylamino-α-[1-(N,N-dimethyl-p-sulfonamidobenzoyl)-2-carboxy-5-(β-phenyl -ethylamino)-3-indolyl] propionamide;
1-methyl-2-aminoethylpyrrolidinyl-α-[1-(o-fluoro-p-chlorobenzoyl)-2-carboxy-5-(p-tolyl-amino)-3-indolyl] valeramide;
α-[1-nicotinoyl-2-carboxy-5-monomethylanilino-3-indolyl] butyramide.

EXAMPLE 19

Utilizing the procedures of Example 6, 1-acylated-2-amino-3-indolyl lower aliphatic amides are prepared from the carboxy indolyl amides produced by the procedure of Example 18:

(1-pyrroyl-2-amino-5-methoxy-3-indolyl)-N,N-dimethyl-acetamide hydrochloride;
(1-p-methylthiobenzoyl-2-amino-5-fluoro-3-indolyl) acetyl morpholide hydrochloride;
[1-(2,4,5-trichlorobenzoyl)-2-amino-5-methyl-3-indolyl] valeramide hydrochloride;
[1-(pyrazolyl-4-carboxy)-2-amino-5-methyl-3-indolyl]-N,N-dimethylacetamide hydrochloride.

EXAMPLE 20

Preparation of substituted amines (a) *1-benzoyl-2-dimethylamino-3-indolyl acetic acid hydrochloride.*—A solution of 1 g. of 1-benzoyl-2-amino-3-indolyl acetic acid hydrochloride in 5 cc. of water is heated at reflux with 5 g. of methyl iodide with good agitation, for 5 hours. The mixture is evaporated to dryness, the residue taken up in water and heated for two hours at 95° C. The cooled mixture is then extracted with ethyl acetate to remove acetylated products. The aqueous layer is cooled in ice, overlayered with n-butanol, and brought to pH 7–7.5 with sodium carbonate. The butanol layer is separated quickly after shaking and is treated promptly with excess hydrochloric acid. Evaporation of the butanol and trituration of the residue with ether yields 1-benzoyl-2-dimethylamino-3-indolyl acetic acid hydrochloride.

Utilizing the above procedure, the following compounds are prepared:

α-[1-(1-methyl - 6-nitro-indazole - 3-carboxy)-2-dibutyl-amino - 5-β-phenylethylamino - 3-indolyl]β,β-dimethyl pentanoic acid hydrochloride,
α-[1-(5-nitro-2-furoyl) - 2-dipentylamino - 5-diisopropyl-amino-3-indolyl] heptanoic acid hydrochloride.

(b) *1-benzoyl-2-methylamino-3-indolyl acetic acid hydrochloride.*—A solution of 1.0 g. of 1-benzoyl-2-amino-3-indolyl acetic acid hydrochloride in 5 cc. of water is heated at reflux for 2 hours with 1 g. of methyl iodide. The mixture is evaporated to dryness and the residue taken up in water, cooled in ice, overlayered with n-butanol and brought to pH 7.0–7.5 with sodium carbonate. The butanol layer is separated quickly after shaking and is treated promptly with excess hydrochloric acid. Evaporation of the residue with ether yields 1-benzoyl-2-methylamino-3-indolyl acetic acid hydrochloride.

Utilizing the above procedure, the following compounds are prepared:

α-(1-nicotinoyl - 2-cyclopropylamino - 5-ethanolamino-3-indolyl) hexanoic acid hydrochloride;
α-[1-(p-methylsulfinylbenzoyl) - 2-ethylamino - 5-diphenylamino-3-indolyl] α-isobutyl acetic acid hydrochloride.

(c) *1-benzoyl-2-acetylamino-3-indolyl acetic acid.*—A solution of 1.0 g. of 1-benzoyl-2-amino-3-indolyl acetic acid hydrochloride is heated at 50° C. with 2 g. of acetic anhydride for one hour. Evaporation of the mixture yields 1-benzoyl-2-acetylamino-3-indolyl acetic acid.

Utilizing the above procedure, the following compounds are prepared:

α-[1-(2-pyrazinyl) - 4-carboxy) - 2-butylamino - 5-benzyl-amino-3-indolyl] valeric acid;
α-[1-(N,N-dimethyl-p-carboxamidobenzoyl) - 2-propionylamino - 5-(p-chloroanilino)-3-indolyl] butyric acid.

(d) By commencing with the anhydrides of [1-(benzofuranyl-3-carboxy) - 2-carboxy - 5-methyl-3-indolyl] acetic acid and α-[1-(benzisoxazolyl-2-carboxy) - 2-carboxy-5-methoxy-3-indolyl] propionic acid and utilizing the procedures of Examples 18 (to get the corresponding amides) and 6 (to produce the 2-amino compounds), the use of the process of this Example yields the following products:

N,N-dimethyl - [1-(benzofuranyl-3-carboxy) - 2-(ethyl-sec-butylamino)-5-methyl-3-indolyl] acetamide;
α-[1-(benzisoxazolyl-2-carboxy) - 2-acetylamino-5-methoxy-3-indolyl] propionamide.

What is claimed is:

1. A compound selected from the group consisting of free bases and pharmaceutically acceptable acid addition salts of compounds represented by the formula:

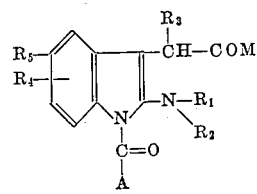

wherein

A is selected from the group consisting of phenyl, substituted phenyl, wherein the substituent is selected from the group consisting of lower alkylthio, halo, lower alkoxy, phenoxy, trifluoroacetyl, N,N-dilower alkylsulfamyl, lower alkanoyl, cyano, trifluoromethylthio, lower alkylsulfinyl lower alkylsulfonyl, benzylthio, mercapto, N,N-dilower alkylcarboxamido, carb-lower alkoxy, N,N-dilower alkylsulfonamido, nitro, dilower alkylamino, lower alkanoylamino and hydroxy; and furyl, 1-methylimidazolyl, 1-methylbenzimidazolyl, 5-nitrofuryl, oxazolyl, benzoxazolyl, thiazolyl, thienyl, 2-phenylthiazolyl and 2-benzylmercaptothiazolyl;

$R_1$ and $R_2$ are each selected from the group consisting of hydrogen, lower alkyl, lower alkanoyl, cyclo lower alkyl and carbobenzyloxy;

$R_3$ is selected from the group consisting of hydrogen and lower alkyl;

$R_4$ is selected from the group consisting of hydrogen and trifluoromethyl;

$R_5$ is selected from the group consisting of hydrogen, hydroxy, halogen, lower alkyl, lower alkoxy, nitro, amino, dilower alkylamino, lower alkanoyl, bis(hydroxy lower alkyl)amino, 1-pyrrolidinyl, 4-methyl-1-piperazinyl, 4-morpholino, amino lower alkyl, di(lower alkyl)amino lower alkyl, trifluoromethyl, benzyloxy, 1-azacyclopropyl, cyclopropylmethyloxy, cyclobutylmethyloxy, diethanolamino, p-chloroanilino, phenethylamino, ethanolamino, benzylamino and cyclopropyloxy;

M is selected from the group consisting of hydroxy, amino, dilower alkylamino, lower alkyl amino, diethanolamine, aniline, monomethylaniline, benzylamine, p-chloroaniline, β-methoxyethylamine, morpholine, p-methoxyaniline, allylamine, phenethylamine, N-ethylphenethylamine, piperazine, N-phenylpiperazine, piperidine, 1-ethyl-2-aminomethyl piperidine, pyrrolidine, 2-aminomethyl pyrrolidine and tetrahydrofurfurylamine; lower alkoxy, cyclolower alkyl-oxy, benzyloxy; OZ wherein Z is selected from the group consisting of sodium, potassium, calcium, aluminum, iron and magnesium and H:B wherein B is an organic base selected from the group consisting of triethylamine, ethanolamine, n-butylamine, 2,3-xylidine, choline and piperazine; and OY wherein Y is represented by the formula

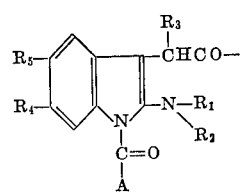

2. (1-p-chlorobenzoyl - 2-amino-5-methoxy-3-indolyl) acetic acid.

3. Methyl - (1-benzoyl-2-amino-5-fluoro-3-indolyl) acetate.

4. (1-p-methylthiobenzoyl - 2-amino-5-methyl-3-indolyl) acetic acid.

5. N,N-dimethyl - [1-p-chlorobenzoyl - 2-(dimethylamino)-5-methyl-3-indolyl] acetamide.

6. α-(1-p-methylthiobenzoyl - 2-acetylamino - 5-methoxy-3-indolyl) acetic acid.

References Cited by the Examiner

UNITED STATES PATENTS

| | | | |
|---|---|---|---|
| 2,947,757 | 8/1960 | Justoni et al. | 260—319 |
| 3,019,232 | 1/1961 | Sakurai et al. | 260—319 |

ALEX MAZEL, *Primary Examiner.*

MARY O'BRIEN, *Assistant Examiner.*